United States Patent
Iou et al.

(10) Patent No.: US 9,200,377 B2
(45) Date of Patent: Dec. 1, 2015

(54) PANEL FRAME CARRIER

(71) Applicants: Hsin-Chi Iou, Taoyuan County (TW); Chien-Wei Chang, Taoyuan County (TW)

(72) Inventors: Hsin-Chi Iou, Taoyuan County (TW); Chien-Wei Chang, Taoyuan County (TW)

(*) Notice: Subject to any disclaimer, the term of this patent is extended or adjusted under 35 U.S.C. 154(b) by 122 days.

(21) Appl. No.: 13/956,827

(22) Filed: Aug. 1, 2013

(65) Prior Publication Data

US 2015/0034480 A1 Feb. 5, 2015

(51) Int. Cl.
*C25D 17/06* (2006.01)
*B65G 17/48* (2006.01)

(52) U.S. Cl.
CPC .............. *C25D 17/06* (2013.01); *B65G 17/485* (2013.01)

(58) Field of Classification Search
CPC .............. B66C 7/12; B66G 9/00; B66G 1/04; C25D 17/06
USPC .................... 414/626, 749.1, 749.6, 277, 279; 104/89, 96, 172.4
See application file for complete search history.

(56) References Cited

U.S. PATENT DOCUMENTS

| | | | | |
|---|---|---|---|---|
| 4,972,936 A * | 11/1990 | Kura | ........................... | 198/465.1 |
| 7,214,022 B2 * | 5/2007 | Melching | ...................... | 414/277 |
| 2006/0237565 A1 * | 10/2006 | Barker | .......................... | 242/229 |
| 2010/0225015 A1 * | 9/2010 | Techlin et al. | .................. | 264/33 |

* cited by examiner

*Primary Examiner* — Ernesto Suarez
*Assistant Examiner* — Ronald Jarrett
(74) *Attorney, Agent, or Firm* — Rosenberg, Klein & Lee (57) ABSTRACT

A panel frame carrier, comprises: a frame body; a transverse first rail assembly arranged at a front side of the frame body; a transverse second rail assembly arranged at a rear side of the frame body; a transformed rail arranged on a support plate; a longitudinal carrying assembly provided for supporting a support plate to drive the longitudinal displacement of the support plate; a panel frame including a sliding platform moveably disposed on the any rails mentioned above; a first moving member provided for pushing the panel frame from the first moving member to the transformed rail; and a second moving member provided for pushing the panel frame from the panel frame to the second moving member; whereby the panel frame is transmitted from an end of the first rail assembly through the transformed rail to the second rail assembly and vice versa.

7 Claims, 9 Drawing Sheets

PANEL FRAME CARRIER

BACKGROUND OF THE INVENTION

1. Field of the Invention

The invention relates to panel frame and more particularly to a panel frame carrier.

2. Description of the Related Art

Figure 1:
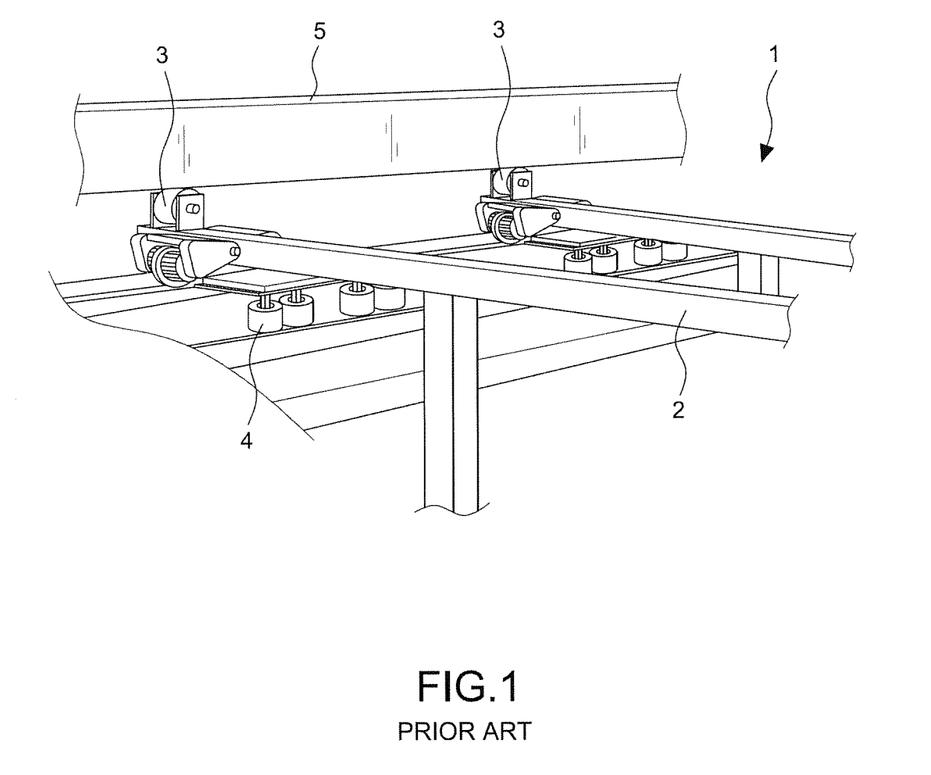
FIG. 1 is a perspective view of a portion of a conventional continuous structure for electroplating.
Figure 2A:
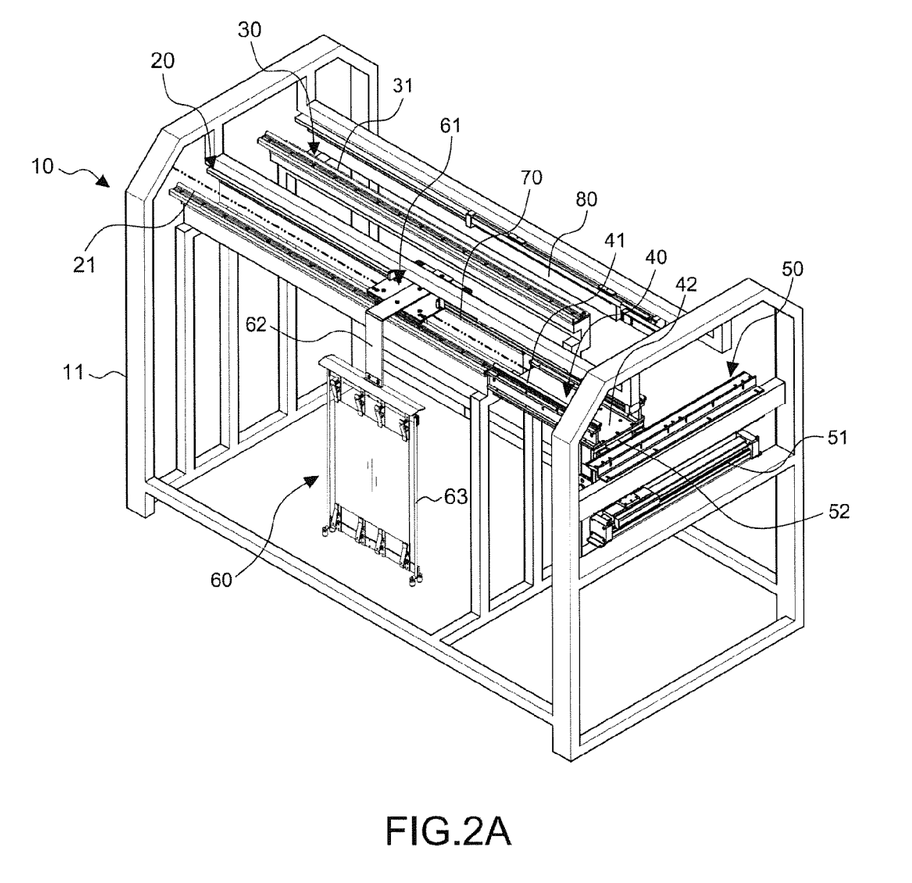
FIG. 2A is a perspective view of a panel frame carrier according to the invention.
Figure 2B:
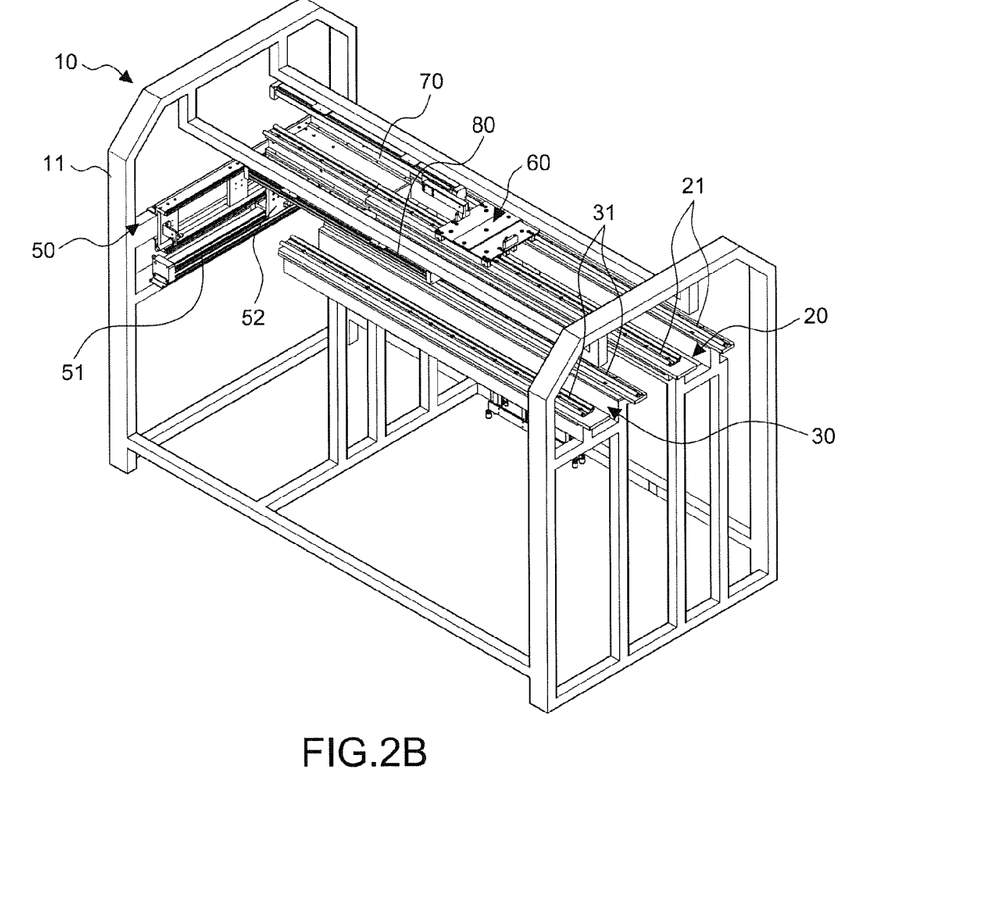
FIG. 2B is another perspective view of the panel frame carrier but viewing from an opposite angle.
Figure 3:
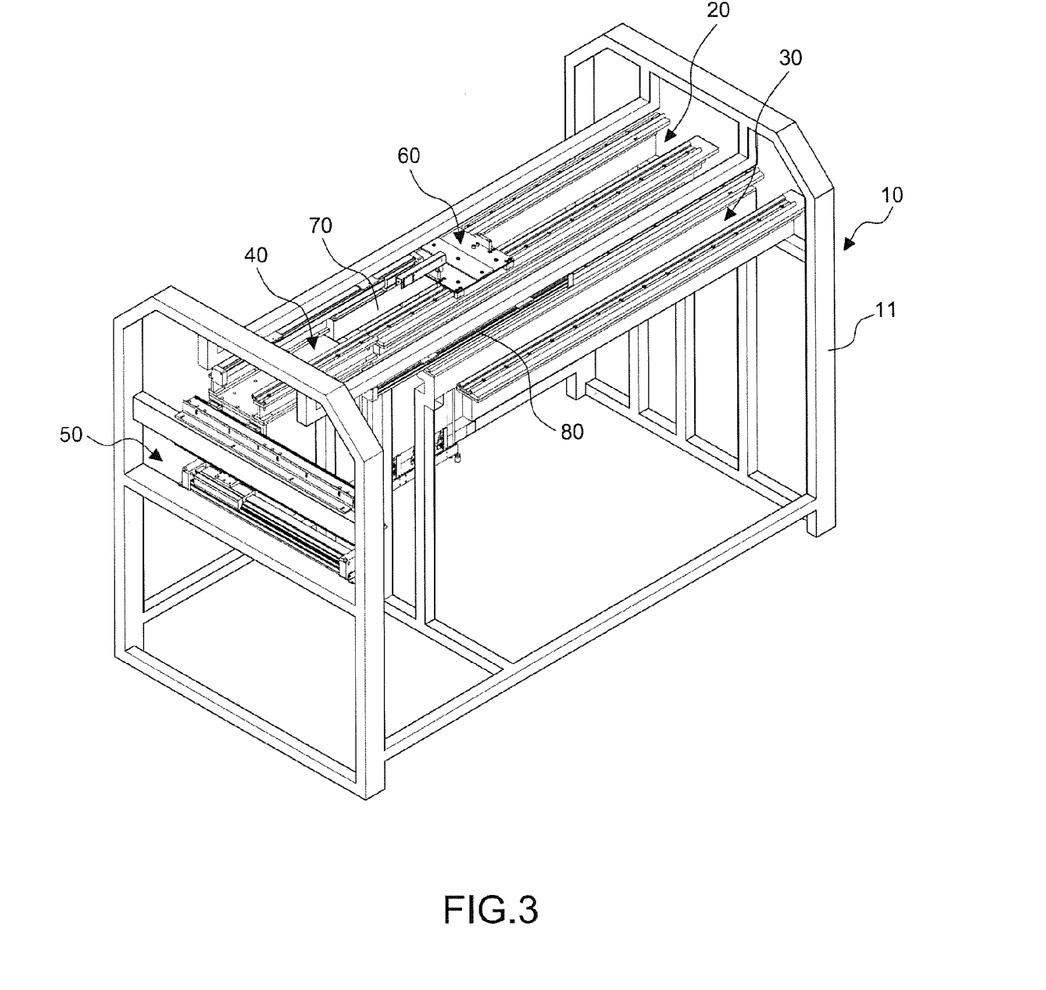
FIG. 3 is still another perspective view of the panel frame carrier but viewing from a different angle.
Figure 4:
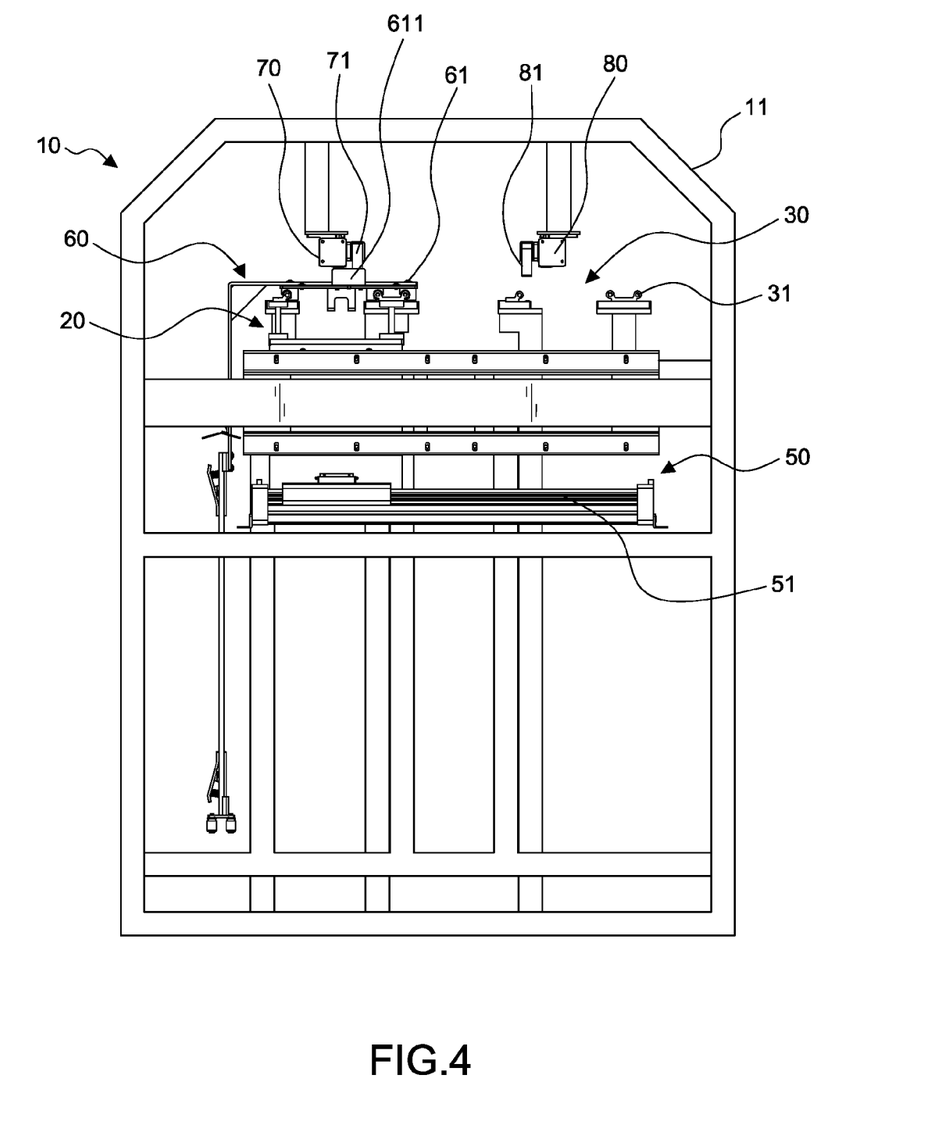
FIG. 4 is a side elevation of the panel frame carrier of FIG. 2A.
Figure 5:
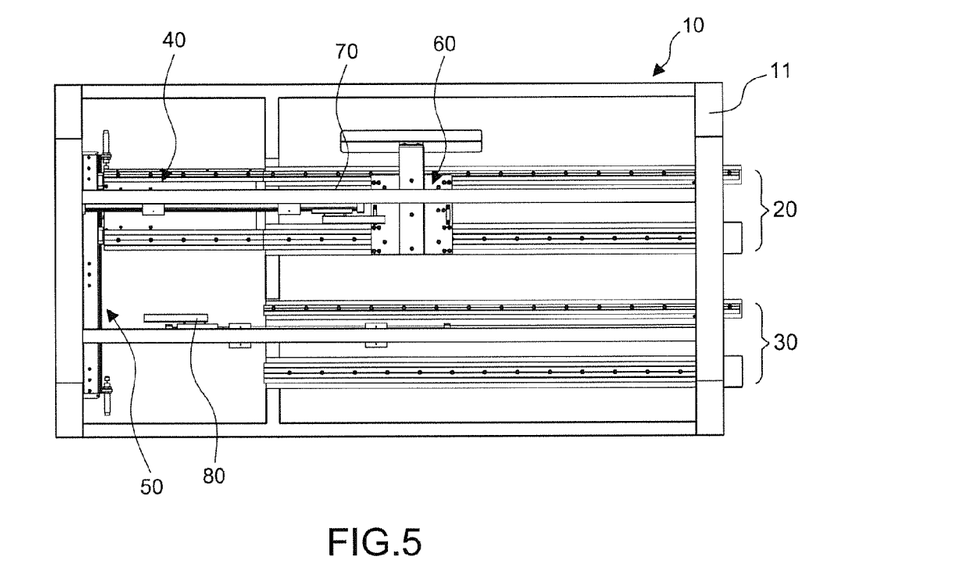
FIG. 5 is a top view of the panel frame carrier of FIG. 2A.
Figure 6:
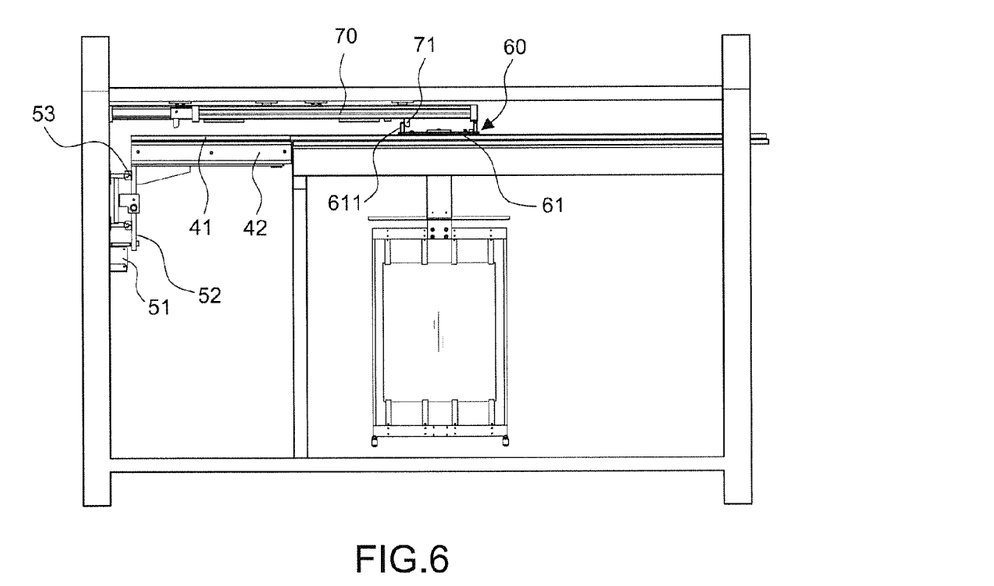
FIG. 6 is a rear view of the panel frame carrier of FIG. 2A.
Figure 7:
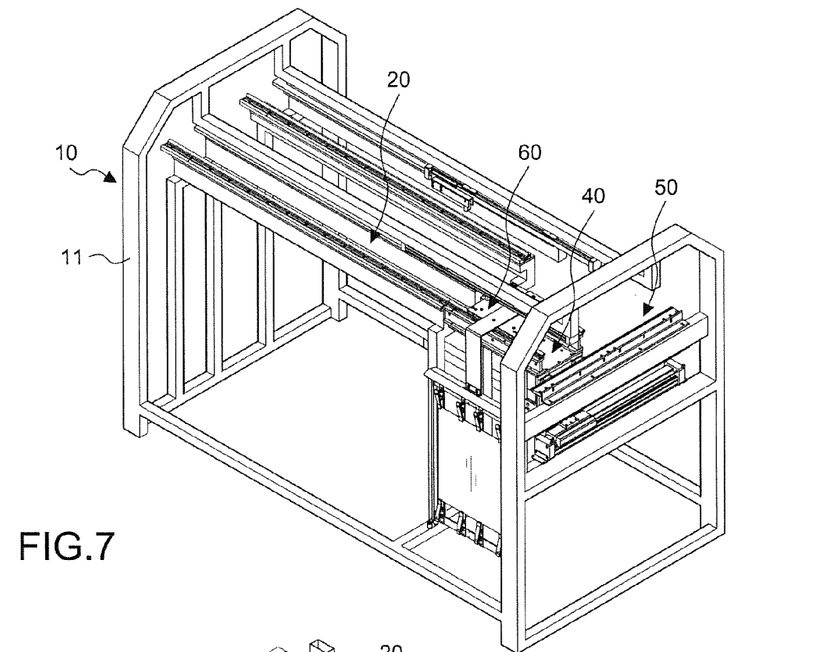
FIGS. 7-10 are perspective views showing use of the panel frame carrier of FIG. 2A.
Figure 8:
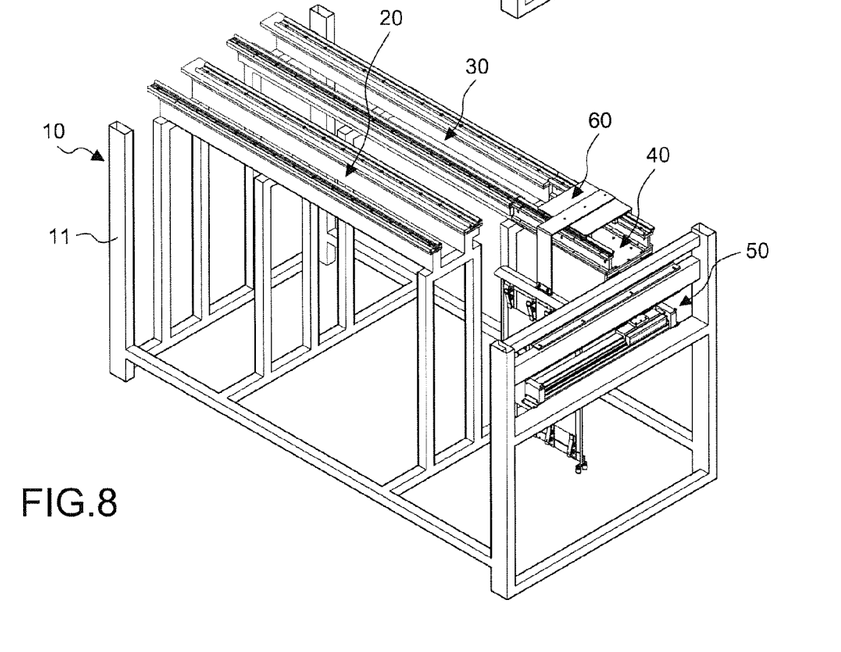
Figure 9:
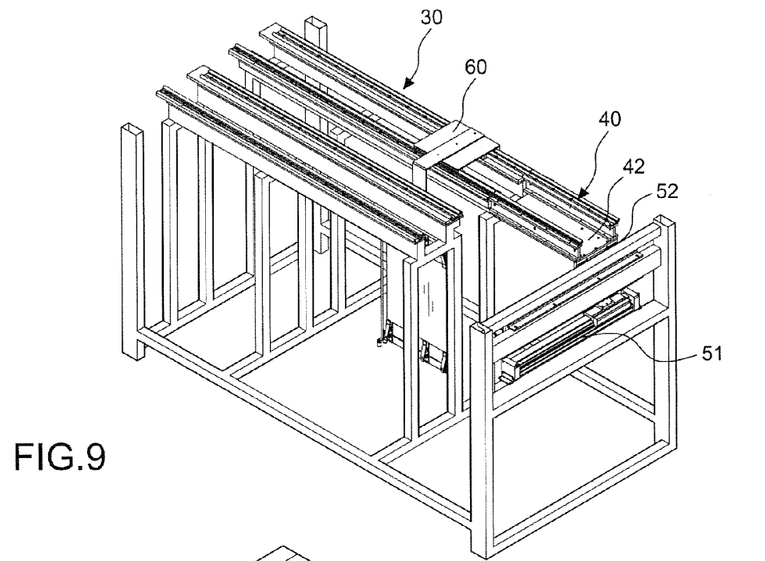
Figure 10:
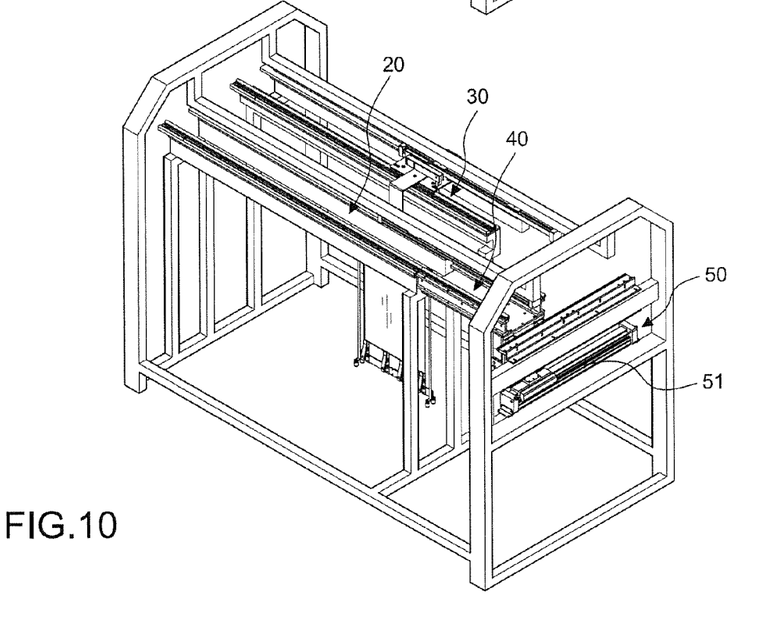
Figure 11A:
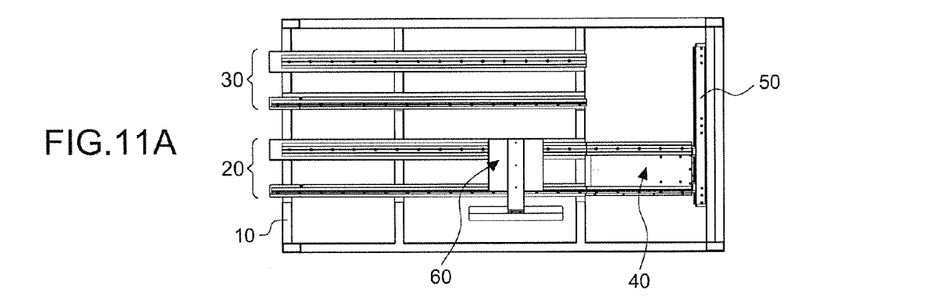
FIGS. 11A, 11B, 11C, and 11D are top views showing a movement of the panel frame carrier of FIG. 2A.
Figure 11B:
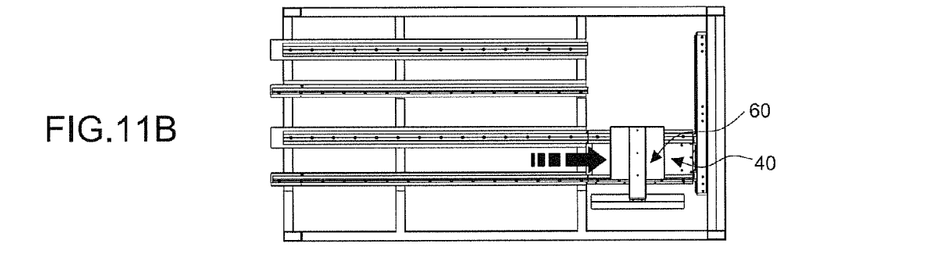
Figure 11C:
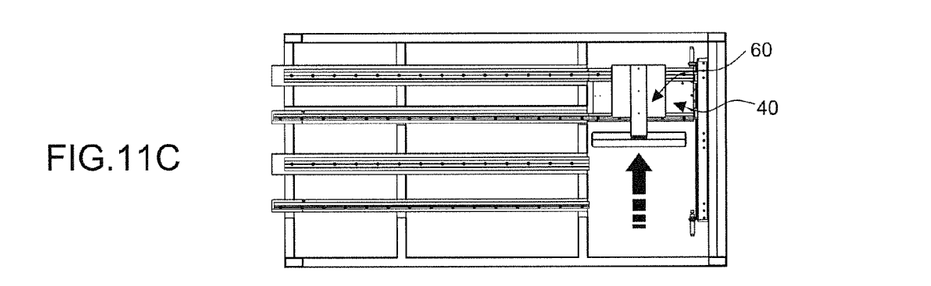
Figure 11D:
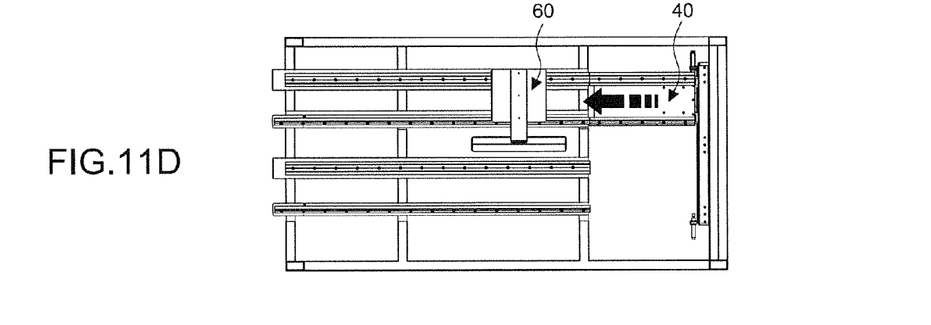

A conventional continuous panel frame 1 for electroplating is shown in FIG. 1 and comprises a plurality of parallel transverse bars 2 each including an upper roller 3 rotatably engaged with a bottom of a longitudinal pressing bar 5, and a plurality of lower rollers 4 rotatably disposed on a lower member. Thus, the continuous panel frame 1 may move.

However, there are a number of drawbacks in above continuous panel frame 1. For example, the rollers 3, 4 tend to wear after a short period time of use. Further, the continuous panel frame 1 may abnormally displace laterally, i.e., along X-axis and thus is not aligned with the longitudinal pressing bar 5, i.e., not aligned along Y-axis. The conventional continuous panel frame 1 is applicable to electroplating having precision of millimeters only rather than electroplating having precision more than millimeters such as wet manufacturing processes of nanometer precision. Furthermore, an employee has to move the continuous panel frame 1 around one side and disadvantageously it may require a larger space and is undesired for the wet manufacturing processes.

Thus, the need for improvement still exists.

SUMMARY OF THE INVENTION

It is a primary object of the present invention to provide a panel frame carrier to carry a panel frame form a transverse first rail assembly through a transformed rail to a transverse second rail assembly and vice versa, making continuous wet manufacturing processes.

It is another object of the present invention to provide a panel frame carrier for stable movement of the panel frame and for precise and continuous movement during the wet manufacturing processes.

In order to achieve the above objects, a panel frame carrier comprises: a frame body including a plurality of frame elements; a transverse first rail assembly arranged at a front side of the frame body and including at least two parallel rails; a transverse second rail assembly arranged at a rear side of the frame body, including at least two parallel rails, and parallel with the transverse first rail assembly at the same height; a transformed rail arranged on a support plate, located at a side of the frame body, and including rails connected to the transverse first rail assembly or a transverse second rail assembly; a longitudinal carrying assembly arranged on the frame element at a side of the frame body and including a drive source and a support member connected to the support plate to drive the longitudinal displacement of the support plate; a panel frame including a sliding platform moveably disposed on the any rails mentioned above, a hanging arm connected to the sliding platform, and a frame connected to the hanging arm; a first moving member disposed above the first rail assembly for pushing the panel frame from the first moving member to the transformed rail; and a second moving member disposed above the second rail assembly and above the panel frame for pushing the panel frame from the panel frame transformed rail to the second rail assembly, whereby the is transmitted from an end of the first rail assembly through the transformed rail to the second rail assembly and vice versa.

Based on the features disclosed, the longitudinal carrying assembly further comprises a plurality of guide rollers for carrying the panel frame either from a front position to a rear position or from the rear position to the front position.

Further, the drive source is a hydraulic cylinder.

Based on the features disclosed, the sliding platform includes front and rear block members on a top thereof to be pushed by the first and second moving members.

Further, the first and second moving members are hydraulic cylinder members and the front ends of the hydraulic cylinder members corresponding to the front and rear block members respectively has a pushing block.

Based on the features disclosed, the panel frame carrier is provided for stably moving the panel frame and transforming the rails to change the movement direction, meeting the need of wet manufacturing processes of nanometer precision.

DETAILED DESCRIPTION OF THE PREFERRED EMBODIMENT

Referring to FIGS. 2A to 11D, a panel frame carrier in accordance with the present invention comprises the following components as discussed in detail below.

A frame body 10 is provided and comprises a plurality of frame elements 11. In the embodiment, frame element of another panel frame carrier can be attached to one side of the panel frame carrier.

A transverse first rail assembly 20 arranged at a front side of the frame body 10 includes at least two parallel rails 21 for a sliding platform 61 of a panel plate 60 to be smoothly moved on the rails.

A transverse second rail assembly 30 arranged at a rear side of the frame body 10 includes at least two parallel rails 31 having the same width with the rails 21 of the transverse first rail assembly 20. The transverse second rail assembly 30 is parallel with the transverse first rail assembly 20 at the same height.

A transformed rail 40 arranged on a support plate 42 is located at a side of the frame body 10 and includes rails 41 connected to the transverse first rail assembly 20 or a transverse second rail assembly 30 wherein the rails 41 are shorter than the rails 21, 31.

A longitudinal carrying assembly 50 arranged on the frame element 11 at a side of the frame body 10 includes a drive source 51 and a support member 52 connected to the support plate 42 to drive the longitudinal displacement of the support plate 42. In the preferred embodiment, the drive source 51 is a hydraulic cylinder but it is not a limitation. In the embodiment, the longitudinal carrying assembly 50 further comprises a plurality of guide rollers 53 for carrying the panel frame 60 either from a front position to a rear position or from the rear position to the front position.

The panel frame 60 includes the sliding platform 61 moveably disposed on the any rails mentioned above, a hanging arm 62 connected to the sliding platform 61, and a frame 63 connected to the hanging arm 62. The preferred embodiment, the sliding platform 61 includes front and rear block members 611 on a top thereof to be pushed by the first and second moving members 70, 80.

A first moving member 70 is disposed above the first rail assembly 20 for pushing the panel frame 60 from the first moving member 70 to the transformed rail 40.

A second moving member 80 is disposed above the second rail assembly 30 and above the panel frame 60 for pushing the panel frame 60 from the transformed rail 40 to the second rail assembly 30. In the preferred embodiment, the first and second moving members 70, 80 are hydraulic cylinder members but it is not a limitation. The front ends of the hydraulic cylinder members corresponding to the front and rear block members 611 each respectively have a pushing block 71, 81.

Whereby the panel frame 60 is transmitted from an end of the first rail assembly 20 through the transformed rail 40 to the second rail assembly 30 and vice versa.

In one operation (see FIGS. 11A to 11D), a user can activate the first moving member 70 to cause the pushing block 71 to push the right block member 611 rightward. Thus, the panel frame 60 moves to the right until the panel frame 60 is disposed on the transformed rail 40. Thereafter, the drive source 51 is triggered by the transformed rail 40 to rotate the guide rollers 53 to carry the transformed rail 40 from a front position to a rear position until being stopped. Finally, the second moving member 80 is activated to cause the pushing block 81 to push the left block member 611 leftward until a desired or terminal position is reached. A reverse operation is also made possible.

It is envisaged by the invention that moving operation of panel frame 60 is smooth. Further, the panel frame 60 can be made longer without abnormal displacement in the vertical direction. Above features are particularly for electroplating having high precision requirement such as wet manufacturing processes of nanometer precision.

While the invention has been described in terms of preferred embodiments, those skilled in the art will recognize that the invention can be practiced with modifications within the spirit and scope of the appended claims.

What is claimed is:

1. A panel frame carrier, comprising:
a frame body including a plurality of frame elements;
a transverse first rail assembly arranged at a front side of the frame body and including at least two parallel rails;
a transverse second rail assembly arranged at a rear side of the frame body, including at least two parallel rails, and parallel with the transverse first rail assembly at the same height;
a transformed rail assembly arranged on a support plate, located at a side of the frame body, and including rails aligned with the transverse first rail assembly when the transformed rail assembly is in a front position and aligned with the transverse second rail assembly when the transformed rail assembly is in a rear position;
a longitudinal carrying assembly arranged on a frame element of the plurality of frame elements, the frame element at a side of the frame body, the longitudinal carrying assembly including a drive source and a support member extending upward from the drive source and connected to one side of the support plate to form with the support plate a substantially L-shape, the support member conveying a driving force by the drive source to drive a longitudinal displacement of the support plate;
a panel frame including a sliding platform moveably disposed on the rails of a selected one of the rail assemblies mentioned above, a hanging arm connected to the sliding platform, and a frame connected to the hanging arm;
a first moving member disposed above the first rail assembly for pushing the panel frame from the first moving member to the transformed rail assembly; and
a second moving member disposed above the second rail assembly and above the panel frame for pushing the panel frame from the transformed rail assembly to the transverse second rail assembly;
whereby the panel frame is transmitted from an end of the first rail assembly through the transformed rail assembly to the second rail assembly and vice versa.

2. The panel frame carrier of claim 1, wherein the longitudinal carrying assembly further includes a plurality of guide rollers for carrying the transformed rail assembly either from the front position to the rear position or from the rear position to the front position.

3. The panel frame carrier of claim 1, wherein the drive source is a hydraulic cylinder.

4. The panel frame carrier of claim 1, wherein the sliding platform includes front and rear block members on a top thereof to be pushed by the first and second moving members.

5. The panel frame carrier of claim 4, wherein the first and second moving members are hydraulic cylinder members, and wherein the front ends of the hydraulic cylinder members corresponding to the front and rear block members each have a pushing block which pushes the respective block member.

6. The panel frame carrier of claim 1, wherein the hanging arm hangs from a side of the sliding platform.

7. The panel frame carrier of claim 1, wherein the transformed rail assembly is connected to the frame body exclusively on the side facing the support member of the longitudinal carrying assembly.

\* \* \* \* \*